(12) United States Patent
Liu et al.

(10) Patent No.: US 11,873,058 B2
(45) Date of Patent: Jan. 16, 2024

(54) INTELLIGENT ELECTRIC WHEEL HUB

(71) Applicant: ZHEJIANG CHAOJI ELECTRICAL TECHNOLOGY CO., LTD, Shaoxing (CN)

(72) Inventors: Jun Liu, Shaoxing (CN); Yingzhi Wang, Shaoxing (CN); Yichuang Liu, Shaoxing (CN)

(73) Assignee: ZHEJIANG CHAOJI ELECTRICAL TECHNOLOGY CO., LTD., Shengzhou (CN)

( * ) Notice: Subject to any disclaimer, the term of this patent is extended or adjusted under 35 U.S.C. 154(b) by 778 days.

(21) Appl. No.: 17/037,771

(22) Filed: Sep. 30, 2020

(65) Prior Publication Data
US 2021/0009232 A1 Jan. 14, 2021

Related U.S. Application Data

(63) Continuation of application No. PCT/CN2019/092078, filed on Jun. 20, 2019.

(30) Foreign Application Priority Data

Jun. 29, 2018 (CN) .......................... 201810699372.6

(51) Int. Cl.
*B60B 27/02* (2006.01)
*B62M 6/65* (2010.01)
(Continued)

(52) U.S. Cl.
CPC ............. *B62M 6/65* (2013.01); *B60B 27/023* (2013.01); *B60B 27/042* (2013.01);
(Continued)

(58) Field of Classification Search
CPC ... B60B 27/023; B60B 27/042; B60B 27/047; B60K 7/0007; B60K 2007/0092;
(Continued)

(56) References Cited

U.S. PATENT DOCUMENTS

| 5,895,333 A * | 4/1999 | Morisawa ................ B60K 6/26 |
| | | 903/910 |
| 6,344,008 B1 * | 2/2002 | Nagano .................... B60K 6/48 |
| | | 903/910 |

(Continued)

FOREIGN PATENT DOCUMENTS

| CN | 202906660 U | 4/2013 |
| CN | 105846596 A | 8/2016 |

(Continued)

OTHER PUBLICATIONS

International Search Report for PCT/CN2019/092078.

*Primary Examiner* — Erez Gurari

(57) ABSTRACT

Provided is an intelligent electric wheel hub which belongs to the field of bicycle parts. Two ends of a cylindrical wheel hub housing (2) of the electric wheel hub are respectively connected to a wheel hub left end cover (25) and an outer flywheel ring (7) of a flywheel mechanism to form an inner cavity for integrating and accommodating a gear motor, a battery pack and a controller panel. The intelligent electric wheel hub is highly integrated and is energy-saving and environmentally friendly.

9 Claims, 2 Drawing Sheets

(51) Int. Cl.
    *B60L 50/30*     (2019.01)
    *B60L 53/00*     (2019.01)
    *B60L 50/20*     (2019.01)
    *B62J 43/20*     (2020.01)
    *B60B 27/04*     (2006.01)
    *B60L 15/20*     (2006.01)
    *B62M 6/50*     (2010.01)
    *B62J 43/13*     (2020.01)
    *B60K 7/00*     (2006.01)

(52) U.S. Cl.
    CPC .......... *B60B 27/047* (2013.01); *B60K 7/0007* (2013.01); *B60L 15/20* (2013.01); *B60L 50/20* (2019.02); *B60L 50/30* (2019.02); *B60L 53/00* (2019.02); *B62J 43/13* (2020.02); *B62J 43/20* (2020.02); *B62M 6/50* (2013.01); *B60K 2007/0092* (2013.01); *B60L 2200/12* (2013.01); *H02J 2207/20* (2020.01)

(58) Field of Classification Search
    CPC .......... B60L 15/20; B60L 50/20; B60L 53/00; B62M 6/50
    See application file for complete search history.

(56) References Cited

U.S. PATENT DOCUMENTS

| | | | | |
|---|---|---|---|---|
| 7,520,179 | B2* | 4/2009 | Bernstein | F16D 3/78 73/801 |
| 8,152,670 | B2* | 4/2012 | Kuzuya | B60W 20/40 475/5 |
| 8,761,984 | B2* | 6/2014 | Yates | B60L 7/18 180/65.6 |
| 9,505,310 | B2* | 11/2016 | Kronfeld | B60L 3/0061 |
| 10,100,927 | B2* | 10/2018 | Quinn, Jr. | F16H 61/6649 |
| 10,260,607 | B2* | 4/2019 | Carter | F16H 37/084 |
| 10,312,775 | B2* | 6/2019 | Wang | B62M 6/50 |
| 2006/0208450 | A1* | 9/2006 | Rizzetto | B62M 6/55 280/210 |
| 2011/0183805 | A1* | 7/2011 | Chan | B62M 6/50 74/516 |
| 2018/0056774 | A1* | 3/2018 | Chan | B62M 6/65 |

FOREIGN PATENT DOCUMENTS

| | | |
|---|---|---|
| CN | 108725683 A | 11/2018 |
| CN | 208774961 U | 4/2019 |
| DE | 102015203677 B3 | 9/2016 |
| JP | 2017040350 A | 2/2017 |
| WO | WO 2017145653 A1 | 8/2017 |

* cited by examiner

INTELLIGENT ELECTRIC WHEEL HUB

CROSS REFERENCE TO RELATED APPLICATIONS

The present application is a continuation-application of International Application PCT/CN2019/092078, with an international filing date of Jun. 20, 2019, which claims foreign priority of Chinese Patent Application No. 201810699372.6, filed on Jun. 29, 2018 in the State Intellectual Property Office of China, the contents of all of which are hereby incorporated by reference.

TECHNICAL FIELD

The present invention belongs to electric bicycle parts, particularly relates to an intelligent electric wheel hub integrated with a driving deceleration motor, a battery, an intelligent controller panel and various sensors.

BACKGROUND

Electric bicycles have been becoming increasingly welcomed by people all over the world due to the advantages of being environmentally friendly, safe, and light. As the core parts of electric bicycles, the motor, motor driver and battery are generally independent parts, which are installed in different parts of the bicycle and connected with wires to perform their respective roles, having low integration, high number of connecting wires, and high probability of failure. During installation, it is necessary to debug each component, which is inconvenient to install and requires a lot of work. One of the technology development trends of electric bicycles is the intelligent energy recovery function, which can recover the kinetic energy of the bicycle and charge the built-in battery when the electric bicycle is sliding, descending and braking.

SUMMARY

The purpose of the present invention is to solve the defects of low integration of motors, motor drivers, batteries and other core driving parts of existing electric bicycle, and to adapt to the development trend of electric bicycle technology, providing an intelligent electric wheel hub that realizes kinetic energy recovery and integration.

For that purpose, the present invention adopts the following technical solutions: an intelligent electric wheel hub comprises a gear motor, a flywheel mechanism and a cylindrical freehub body; wherein the intelligent electric wheel hub further includes a cylindrical battery pack, a wheel hub left end cover, a cylindrical wheel hub housing, a wheel hub left half shaft, a wheel hub right half shaft, a riding state sensing device and a controller panel. The freehub body is sleeved on the wheel hub right half shaft by supporting bearing. The wheel hub left end cover is sleeved on the wheel hub left half shaft by supporting bearing and is fixedly connected to the left end of the wheel hub housing. The flywheel mechanism includes an outer flywheel ring and an inner flywheel ring that are matched by ratchet-pawl and nested by supporting bearing. The inner flywheel ring is fixedly connected to the freehub body, and the outer flywheel ring is fixedly connected to the right end of the wheel hub housing to form a wheel hub inner cavity accommodating the gear motor and the battery pack. A motor housing of the gear motor is fixedly connected to the wheel hub left half shaft and the wheel hub right half shaft, and the gear motor is connected to the wheel hub left end cover through a decelerating mechanism to drive the wheel hub left end cover to rotate. The battery pack is fixedly sheathed outside the motor housing. The battery pack is electrically connected to the controller panel to power the controller panel. The controller panel includes a riding state sensing device and a processor, a motor driving module. The riding state sensing device includes a multi-pole magnetic ring rotating with the freehub body, a Hall sensor sensing the rotation direction of the multi-pole magnetic ring. The Hall sensor is signal connected to the processor. The motor driving module is connected to the processor. And the motor driving module is electrically connected to a coil of the stator. The processor controls the motor driving module to drive the gear motor to run.

When in use, the present invention is installed on the bicycle rear fork through the wheel hub left half shaft and wheel hub right half shaft. A sprocket is installed on the freehub body and is connected with a chainring on the bottom bracket of the bicycle through a chain. When a person is riding, the pedal force is converted into the rotation of the chainring by the pedal, thus driving the sprocket and the freehub body to rotate forward through the chain. The freehub body drives the outer flywheel ring to rotate forward through the ratchet-pawl mechanism, thereby driving the wheel hub housing which is fixedly connected to the outer flywheel ring to rotate forward so as to realize the forward rotation of the bicycle wheel to push the bicycle forward. Simultaneously, the multi-pole magnetic ring that rotates with the freehub body also rotates forward. At this time, the sensor that senses the direction of rotation detects that the bicycle is going forward, and sends this signal to the processor on the controller panel. The processor controls to turn on the motor driving module to drive the gear motor, and drives the wheel hub left end cover to rotate forward through the planetary gear mechanism, thereby driving the wheel hub housing fixedly connected to the wheel hub left end cover to rotate forward, providing a boosting effect for pushing the bicycle forward. When the person on the bicycle stops pedaling, the freehub body stops rotating and the pawl does not work. The bicycle wheel still drives the outer flywheel ring to rotate. The multi-pole magnetic ring stops rotating. After detecting this, the sensor sends a signal to the processor, and the motor driving module stops working. At this time, the bicycle generally does not stop moving, but will still coast with inertia.

As a supplement and improvement to the above solution, the present invention further includes the following technical features.

The controller panel further comprises an energy recovery and charging mechanism. The energy recovery and charging mechanism includes a bridge rectifier, a DC boost module and a charging control circuit that are sequentially connected between the coil of the stator and the battery pack. The bridge rectifier, the DC boost module and the charging control circuit are all integrated into the controller panel. The charging control circuit is connected to the processor and the processor controls the charging control circuit to turn off or turn on. When the multi-pole magnetic ring reverses or does not rotate, the bicycle coasts, and the wheel hub housing drives the rotor of the gear motor to keep rotating through the wheel hub left end cover. The gear motor is converted into a generator, and the coil of the stator generates current. The motor driving module is turned off and the charging control circuit is turned on to charge the battery. When the multi-pole magnetic ring rotates forward, the motor driving module works, the gear motor rotates and the charging control circuit is turned off. The two work alternately. It can be set that when the coasting speed of the bicycle is greater than a set value, the processor controls the energy recovery and charging mechanism to turn on to charge the battery pack, and when coasting speed of the bicycle is less than the set value, the energy recovery and charging mechanism is turned off to avoid increasing resistance when people push the bicycle.

The intelligent electric wheel hub further includes a vibration delay switch installed on the controller panel. The vibration delay switch is connected between the battery pack and a power input terminal of the controller panel, to control the current on and off between the battery pack and the controller panel. Since the intelligent electric wheel hub has no external connection wires, it is unable to turn on and off through an external switch like an ordinary electric bicycle. When the vibration delay switch detects a certain amplitude of vibration, for example, when a bicycle is taken out for riding, it will turn on to power the controller panel. When the vibration delay switch detects no vibration, i.e., when the riding ends, for more than a set time, for example 10 minutes, it will turn off to save power.

The controller panel is further integrated with a Bluetooth communication module, and the Bluetooth communication module is connected to the processor. The Bluetooth communication module can communicate with external Bluetooth devices. Some parameters of the controller panel, e.g., the output power of the gear motor, the charging current of the energy recovery system, etc., can be set by external Bluetooth devices. The controller panel can also send the operating parameters of the electric wheel hub to external Bluetooth devices, including speed of the bicycle, output power of the gear motor, charging power, and mileage.

The motor housing includes a left end cover, a right end cover and a left cover board. The left end cover is provided with a recessed inner cavity to accommodate the deceleration mechanism, and the left cover board is mounted on the mouth of the recessed inner cavity to encapsulate the deceleration mechanism. The wheel hub right half shaft is connected with the right end cover as a whole, and the left cover board is connected with the wheel hub left half shaft as a whole. The rotor's rotating shaft is installed through the supporting bearing in the bearing holes of the left end cover and the right end cover, making the structure compact.

The planetary decelerating mechanism is a gear decelerating mechanism. The output end is an internal gear ring fixedly connected to the wheel hub left end cover through the transfer of a connection ring. The input end is a gear, and the gear is directly formed on the rotating shaft of the rotor or sleeved on the rotating shaft of the rotor. A planetary gear is installed through the supporting shaft that installed on the left cover board and the left end cover.

The planetary deceleration mechanism can also be a friction wheel deceleration mechanism. The output end is a rim with an inner surface as a friction surface, and the rim is fixedly connected to the wheel hub left end cover through the transfer of the connecting ring. The input end is a rotating shaft of the rotor or a friction wheel sleeved on the rotating shaft. The planetary gear is installed through the supporting shaft that installed on the left cover board and the left end cover.

The controller panel is circular plate shape with a central through-hole. The controller panel is sleeved on the wheel hub right half shaft through the central through-hole and fastened to the right end cover of the motor housing by screws, which enables the controller panel to be accommodated in the wheel hub inner cavity and makes the structure compact.

The battery pack includes a cylindrical base, a rechargeable battery, and a strap. The batteries are arranged around the base in series or in parallel, and secured by the straps. The number of battery set can be determined according to the needs and the internal volume. The battery is easy to assemble and disassemble. The inner cavity of the base is provided with an axial shoulder protruding inwardly, which is located between the right end cover of the motor housing and the controller panel, and is axially limited by the pressure of the right end cover and the controller panel from both sides.

The wheel hub right half shaft is hollow. And the intelligent electric wheel hub further includes a charging socket embedded in an outer end of a hollow inner cavity of the wheel hub right half shaft. The charging socket is electrically connected to the rechargeable battery, and can be connected with external charging device to charge the battery pack. The built-in charging socket makes the structure compact.

The present invention can achieve the following beneficial effects: 1. The structure is compact, reasonable, highly integrated and less occupied by designing the ring-shaped battery pack sheathed outside the gear motor, and integrating the battery pack, the gear motor, the controller panel and the riding state sensing device into the wheel hub inner cavity. It makes the core components of the bicycle easy to install and debug, less prone to failure, have high system efficiency, have low wear and tear, and very suitable for the existing bicycles to be electrically modified. 2. The controller panel integrates with a processor, a pedal direction Hall sensor, an energy recovery and charging mechanism, and a Bluetooth communication module. By such design, according to the pedaling direction, the controller panel can control the gear motor to operate for boosting effect or to convert into a generator for recycling surplus kinetic energy generated when the bicycle is coasting, descending and braking, which can replace the brake device for braking function. Operating parameters are real-time displayed, and intelligent control as well as green travel that is energy-saving and environmentally friendly are achieved.

DETAILED DESCRIPTION

The specific embodiments of the present invention will be described in detail below with reference to the drawings.

Figure 1:
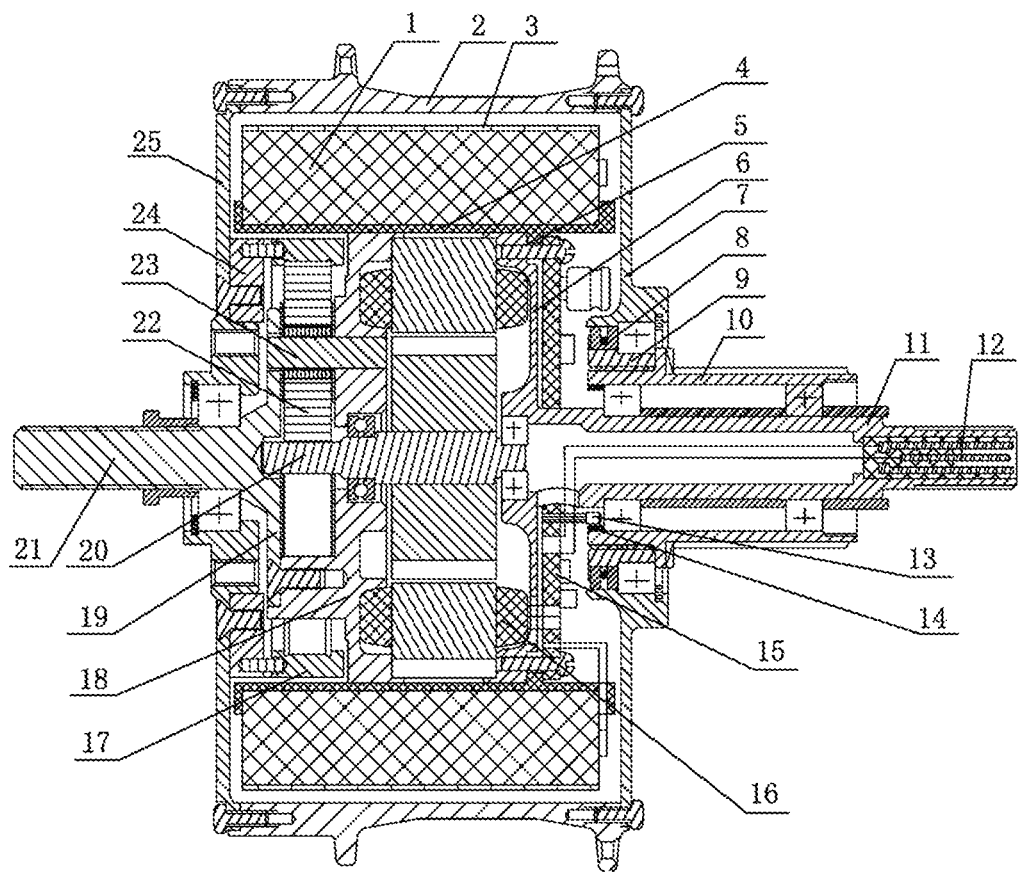
FIG. 1 is a cross-sectional view of the present invention.

As shown in FIG. 1, the present invention includes a gear motor, a flywheel mechanism, a freehub body 10, a battery pack, a wheel hub left end cover 25, a wheel hub housing 2, a wheel hub left half shaft 21, a wheel hub right half shaft 11, a riding state sensing device and a controller panel, wherein the gear motor, the battery pack, the riding state sensing device and the controller panel are all contained in the inner cavity of the wheel hub housing 2. The gear motor includes a motor housing, a stator, a rotor and a planetary decelerating mechanism. The motor housing includes a left end cover 18, a right end cover 6 and a left cover board 19. The wheel hub right half shaft 11 is connected with the right end cover 6 as a whole. The rotor's rotating shaft 20 of the gear motor is installed through the supporting bearing in the bearing holes of the left end cover 18 and the right end cover 6. The left end cover 18 is provided with a recessed inner cavity, and the left cover board 19 is mounted on the mouth of the recessed inner cavity and tightened with the left end cover 18 by screws. The left cover board 19 is connected with the wheel hub left half shaft 21 as a whole. The output end of the planetary decelerating mechanism is an internal gear ring 17, while the input end is a gear, which is sleeved or directly formed on the rotor's rotating shaft 20. The planetary gear 22 is supported and installed by the shaft 23, which is fixedly installed on the left end cover 18 and the left cover board 19. The wheel hub left end cover 25 is sleeved on the wheel hub left half shaft 21 by supporting bearing. The internal gear ring 17 is fixedly connected to the wheel hub left end cover 25 through the transfer of the connecting ring 24.

The freehub body 10 is cylindrical and is sleeved on the wheel hub right half shaft 11 by supporting bearing. The flywheel mechanism includes an outer flywheel ring 7 and an inner flywheel ring 9, wherein the inner flywheel ring 9 is fixedly sleeved on the freehub body 10. The outer flywheel ring 7 is disc-shaped and is provided with a central through-hole. The outer flywheel ring 7 is sleeved on inner flywheel ring 9 by supporting bearing set in the central through-hole. A ratchet tooth is provided at one end of the hole wall of the central through-hole, and a pawl 8 matched with the ratchet tooth is installed on the inner flywheel ring 9.

The outer flywheel ring 7 is fixedly connected to the right end of the wheel hub housing 2, and the wheel hub left end cover 25 is fixedly connected to the left end of the wheel hub housing 2. The outer flywheel ring 7, the wheel hub left end cover 25 and the wheel hub housing 2 enclose an inner cavity to accommodate the gear motor, the battery pack, the planetary decelerating mechanism, the riding state sensing device and the controller panel.

Figure 2:
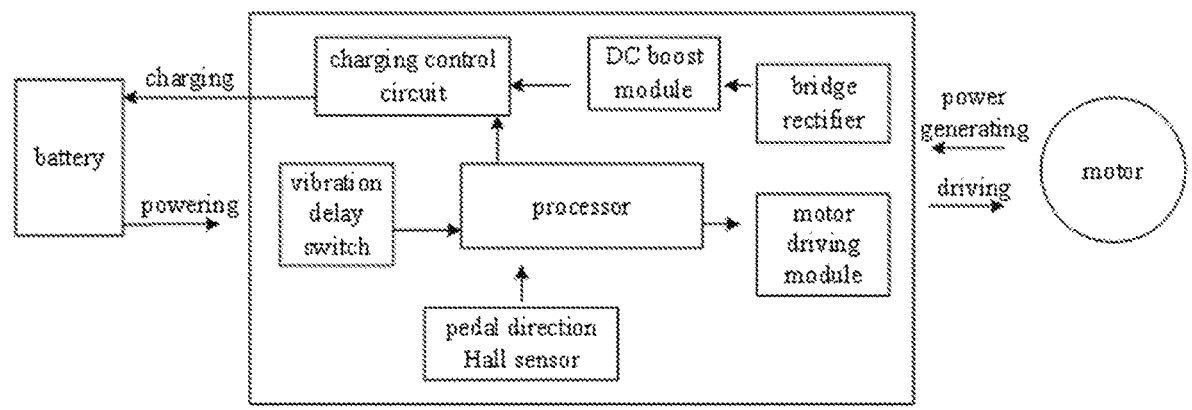
FIG. 2 is a schematic block diagram of the controller panel of the present invention.

As shown in FIG. 2, the battery pack is electrically connected to the controller panel to power the controller panel. A vibration delay switch is connected between the battery pack and the power input terminal of the controller panel. The controller panel includes a riding state sensing device and a processor, a motor driving module, a Bluetooth communication module, and an energy recovery and charging mechanism integrated on the controller panel 15. The controller panel 15 is circular plate shape with a central through-hole. The controller panel is sleeved on the wheel hub right half shaft 11 through the central through-hole and fastened to the right end cover 6 of the motor housing by screws. The vibration delay switch is installed on the controller panel 15. The processor is a single chip microcomputer. The riding state sensing device includes a multi-pole magnetic ring 14 that rotates with the freehub body, and a Hall sensor 13 that senses the rotation direction of the multi-pole magnetic ring. The Bluetooth communication module and the Hall sensor 13 are signal connected to the processor through the controller panel 15. The motor driving module is connected to the processor, and the motor driving module is electrically connected to the coil 16 of the stator. The processor controls the battery pack to drive the gear motor through the motor driving module to run. The energy recovery and charging mechanism includes a bridge rectifier, a DC boost module and a charging control circuit that are sequentially connected between the coil 16 of the stator and the battery pack. The bridge rectifier, the DC boost module and the charging control circuit are all integrated into the controller panel 15. The charging control circuit is connected to the processor and the processor controls the operation of the charging control circuit.

The battery pack includes a cylindrical base 4, a rechargeable battery 1 and a strap 3. The rechargeable batteries 1 are arranged around the base 4 and secured by the strap 3. The inner cavity of the base 4 is provided with a axial shoulder 5 protruding inwardly. The axial shoulder 5 is located between the right end cover 6 of the motor housing and the controller panel 15, and is axially limited by the pressure of the right end cover 6 and the controller panel 15 from both sides.

The wheel hub right half shaft 11 is hollow, and the outer end of the hollow inner cavity of the wheel hub right half shaft is embedded with a charging socket 12, which is electrically connected to the rechargeable battery 1.

The present invention is installed on the bicycle rear fork through the wheel hub left half shaft and wheel hub right half shaft. A sprocket is installed on the freehub body and is connected with a chainring on the bottom bracket of the bicycle through a chain. When a person is riding, the pedal force is converted into the rotation of the chainring by the pedal, thus driving the sprocket and the freehub body to rotate forward, through the chain. The freehub body drives the outer flywheel ring to rotate forward through the ratchet-pawl mechanism, thereby driving the wheel hub housing which is fixedly connected to the outer flywheel ring to rotate forward so as to realize the forward rotation of the bicycle wheel to push the bicycle forward. Simultaneously, the multi-pole magnetic ring that rotates with the freehub body also rotates forward. At this time, the sensor that senses the direction of rotation detects that the bicycle is going forward, and sends this signal to the processor on the controller panel. The processor controls to turn on the motor driving module to drive the gear motor, and drives the wheel hub left end cover to rotate forward through the planetary gear mechanism, thereby driving the wheel hub housing fixedly connected to the wheel hub left end cover to rotate forward, providing a boosting effect for pushing the bicycle forward. When the person on the bicycle stops pedaling, the freehub body stops rotating and the pawl does not work. The bicycle wheel still drives the outer flywheel ring to rotate. The multi-pole magnetic ring stops rotating. After detecting this, the sensor sends a signal to the processor, and the motor driving module stops working. At this time, the bicycle generally does not stop moving, but will still coasts with inertia.

When the bicycle is coasting, the wheel hub housing drives the rotor of the gear motor to keep rotating through the wheel hub left end cover and the planetary reduction mechanism. The gear motor is converted into a generator, and the coil of the stator generates current which is adjusted and boosted by the bridge rectifier, DC boost module and charging control circuit to charge the battery. When the bicycle speed is set greater than 6 km/h, the processor controls the energy recovery and charging mechanism to turn on to charge the battery, and when the speed is less than 6 km/h, the energy recovery and charging mechanism is turned off to avoid increasing resistance when people push the bicycle.

As another embodiment, the deceleration mechanism of the gear motor may also be a friction wheel deceleration mechanism. The output end is a rim with an inner surface as a friction surface, and the rim is fixedly connected to the wheel hub left end cover through the transfer of the connecting ring. The input end is a rotating shaft of the rotor or a friction wheel sleeved on the rotating shaft. The planetary gear is installed through the supporting shaft installed on the left cover board and the left end cover.

What is claimed is:

1. An intelligent electric wheel hub comprising a gear motor, a flywheel mechanism and a cylindrical freehub body; wherein the intelligent electric wheel hub further comprises a cylindrical battery pack, a wheel hub left end cover, a cylindrical wheel hub housing, a wheel hub left half shaft, a wheel hub right half shaft, a riding state sensing device and a controller panel; wherein the freehub body is sleeved on the wheel hub right half shaft by supporting bearing; wherein the wheel hub left end cover is sleeved on the wheel hub left half shaft by supporting bearing and is fixedly connected to the left end of the wheel hub housing; wherein the flywheel mechanism comprises an outer flywheel ring and an inner flywheel ring that are matched by ratchet-pawl and nested by supporting bearing, the inner flywheel ring fixedly connected to the freehub body, and the outer flywheel ring fixedly connected to the right end of the wheel hub housing to form a wheel hub inner cavity accommodating the gear motor and the battery pack; wherein a motor housing of the gear motor is fixedly connected to the wheel hub left half shaft and the wheel hub right half shaft, and the gear motor is connected to the wheel hub left end cover through a decelerating mechanism to drive the wheel hub left end cover to rotate; wherein the battery pack is fixedly sheathed outside the motor housing; wherein the battery pack is electrically connected to the controller panel to power the controller panel; wherein the controller panel comprises a riding state sensing device and a processor, a motor driving module, wherein the riding state sensing device comprises a multi-pole magnetic ring rotating with the freehub body, and a Hall sensor sensing the rotation direction of the multi-pole magnetic ring, the Hall sensor signal connected to the processor, the motor driving module connected to the processor, and the motor driving module electrically connected to a coil of the stator, wherein the processor controls the motor driving module to drive the gear motor to run.

2. The intelligent electric wheel hub of claim 1, wherein the controller panel further comprises an energy recovery and charging mechanism, the energy recovery and charging mechanism comprising a bridge rectifier, a DC boost module and a charging control circuit that are sequentially connected between the coil of the stator and the battery pack, the bridge rectifier, the DC boost module and the charging control circuit all integrated into the controller panel, wherein the charging control circuit is connected to the processor and the processor controls the charging control circuit to turn off or turn on.

3. The intelligent electric wheel hub of claim 1, wherein a vibration delay switch installed on the controller panel is connected between the battery pack and a power input terminal of the controller panel, to control the current on and off between the battery pack and the controller panel.

4. The intelligent electric wheel hub of claim 2, wherein a vibration delay switch installed on the controller panel is connected between the battery pack and a power input terminal of the controller panel, to control the current on and off between the battery pack and the controller panel.

5. The intelligent electric wheel hub of claim 1, wherein the controller panel is further installed with a Bluetooth communication module connected to the processor.

6. The intelligent electric wheel hub of claim 2, wherein the controller panel is further installed with a Bluetooth communication module connected to the processor.

7. The intelligent electric wheel hub of claim 1, wherein the battery pack comprises a cylindrical base, a rechargeable battery, and a strap, wherein the batteries are arranged around the base and secured by the strap, and the inner cavity of the base is provided with an axial shoulder protruding inwardly, wherein the axial shoulder is located between a right end cover of the motor housing and the controller panel that are axially connected by screws, and the axial shoulder is axially limited by the pressure of the right end cover and the controller panel from both sides.

8. The intelligent electric wheel hub of claim 2, wherein the wheel hub right half shaft is hollow, and the intelligent electric wheel hub further comprises a charging socket embedded in an outer end of a hollow inner cavity of the wheel hub right half shaft, the charging socket electrically connected to the rechargeable battery.

9. The intelligent electric wheel hub of claim 7, wherein the wheel hub right half shaft is hollow, and the intelligent electric wheel hub further comprises a charging socket embedded in an outer end of a hollow inner cavity of the wheel hub right half shaft, the charging socket electrically connected to the rechargeable battery.

* * * * *